United States Patent [19]

Baron et al.

[11] 3,926,922
[45] Dec. 16, 1975

[54] POLYURETHANE ELASTOMERS PREPARED FROM DIAMINE CURING AGENTS

[75] Inventors: Richard C. Baron, North Andover; Leon D. Cerankowski, Carlisle; Neil Mattucci, Billerica, all of Mass.

[73] Assignee: Polaroid Corporation, Cambridge, Mass.

[22] Filed: Mar. 14, 1974

[21] Appl. No.: 451,078

[52] U.S. Cl..... 260/77.5 AM; 260/75 NM; 117/161
[51] Int. Cl.². .......................................... C08G 18/06
[58] Field of Search 260/77.5 AM, 2.5 AM, 75 NM

[56] References Cited
UNITED STATES PATENTS
3,681,290  8/1972  Meckel et al............... 260/77.5 AM

*Primary Examiner*—M. J. Welsh
*Attorney, Agent, or Firm*—Philip G. Kiely

[57] ABSTRACT

Diamine cured polyurethane products are prepared by combining a isocyanate terminated urethane prepolymer with a compound of the formula:

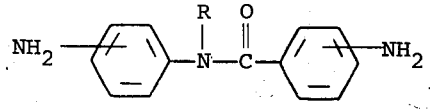

wherein R is hydrogen or alkyl.

20 Claims, No Drawings

POLYURETHANE ELASTOMERS PREPARED FROM DIAMINE CURING AGENTS

BACKGROUND OF THE INVENTION

Hard, impact resistant polyurethane products are particularly desirable. However, in attempting to obtain such products, the art has met with some difficulty, particularly with regard to the selection of a suitable curing agent. Many diamines have been considered for use as a curing agent for isocyanate terminated polyurethane prepolymers, but most are generally deficient in some respect.

U.S. Pat. No. 3,188,302 discloses a class of diamine curing agents which are particularly suitable for use in preparing such polyurethane products. However, these materials also present difficulties, including toxicity problems during processing which include the curing step.

The present invention is directed to novel diamine cured polyurethane products and to novel diamine curing agents suitable for use with isocyanate terminated prepolymers.

SUMMARY OF THE INVENTION

The present invention is directed to diamine cured polyurethane products prepared by combining an isocyanate terminated urethane prepolymer with a diamine curing agent of the formula:

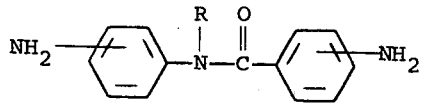

wherein R is hydrogen or alkyl.

DETAILED DESCRIPTION OF THE INVENTION

Isocyanate terminated urethane prepolymers are cured to provide strong, rubbery, abrasion resistant solids by means of the present invention. The novel diamine curing agents are particularly useful in hot melt techniques alone or in combination with other diamines within the scope of the present invention since a wide variety of melting points and curing agents can be employed. The curing agents of the present invention are generally stable at hot melt temperatures; are nontoxic; and exhibit kinetics that provide useful pot life and curing times. In addition, the solubility characteristics of the curing agents permit their use in a number of solvent based coating systems.

The novel curing agents may be represented by the formula:

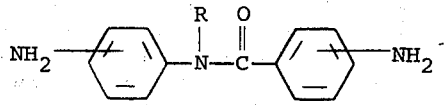

wherein R is hydrogen or alkyl, preferably a 1-4 carbon alkyl group.

Each ring contains at least one amino group but may contain more than one. The amine group may be ortho, meta or para to the amide group and the diamine may be symmetrical or unsymmetrical. The preferred position of the amine group for forming 3-dimensional cured polyurethanes is the para position.

In addition to one or more amine groups, the ring may contain a variety of substituents. However, active hydrogen containing groups should be avoided. Thus, hydroxyl, carboxyl, hydroxylimino, and sulfo groups should be avoided. As examples of substituents which can satisfactorily be employed, mention may be made of alkyl, halogen, phenyl, nitro, sulfonyl, alkoxy, and the like.

The novel curing agents of the present invention are prepared by reacting a nitrobenzoyl chloride with a nitroaniline and reducing the thus-formed compound to the amine.

As examples of nitroanilines suitable for use in the present invention, mention may be made of the following:

p-nitroaniline
m-nitroaniline
o-nitroaniline
3-nitro-4-aminoanisole
4-nitro-2-aminoanisole
5-nitro-2-aminoanisole
4-nitro-1-aminobenzene-6-methyl sulfone
3-nitro-4-aminotoluene
4-nitro-2-aminotoluene
5-nitro-2-aminotoluene
5-nitro-4-aminotoluene
3-nitro-4-chloroaniline
3-nitro-6-chloroaniline
4-nitro-2,5-dimethoxyaniline
2-nitro-4-methylaniline
N-methyl-p-nitroaniline
N-ethyl-p-nitroaniline
3,5-dinitroaniline As examples of nitrobenzoyl chlorides suitable for use in preparing the diamine curing agent of the present invention, mention may be made of the following:

p-nitrobenzoyl chloride
m-nitrobenzoyl chloride
3,5-dinitrobenzoyl chloride
3-nitro-4-chlorobenzoyl chloride
2-methyl-3-nitrobenzoyl chloride
2-methyl-4-nitrobenzoyl chloride
2-methyl-5-nitrobenzoyl chloride
2-methyl-6-nitrobenzoyl chloride
3-methyl-2-nitrobenzoyl chloride
3-methyl-4-nitrobenzoyl chloride
3-methyl-6-nitrobenzoyl chloride
4-methyl-3-nitrobenzoyl chloride
2-chloro-3,5-dinitrobenzoyl chloride
4-chloro-3,5-dinitrobenzoyl chloride
2-chloro-3-nitrobenzoyl chloride
2-chloro-4-nitrobenzoyl chloride
2-chloro-5-nitrobenzoyl chloride
3-chloro-2-nitrobenzoyl chloride
4-chloro-2-nitrobenzoyl chloride
4-chloro-3-nitrobenzoyl chloride
5-chloro-2-nitrobenzoyl chloride
2,4-dichloro-3,5-dinitrobenzoyl chloride
2,6-dinitrobenzoyl chloride
3,4-dinitrobenzoyl chloride
3,5-dinitrobenzoyl chloride
3,5-dinitro-o-toluic acid chloride
3,5-dinitro-p-toluic acid chloride
4-methylthio-3-nitrobenzoyl chloride
4-fluoro-2-nitrobenzoyl chloride The following nonlimiting examples illustrate the preparation of the novel curing agents of the present invention.

EXAMPLE I

To a solution of 18.5 g. of p-nitrobenzoyl chloride in 50 cc. tetrahydrofuran was added a solution of 13.8 g. of p-nitroaniline in 50 cc. tetrahydrofuran. After stirring for 1½ hours at room temperature, the solution was filtered and the precipitate was dried in a vacuum to provide 25 g. of p,p'-dinitrobenzanilide, a yellow solid melting at 264°–267° C. 28 g. of p,p'-dinitrobenzanilide was suspended in 500 cc. absolute ethanol, the solution was flushed with nitrogen for one hour and then 0.2 g. of 10% palladium or charcoal (previously moistened with ethanol) was added. After stirring 15 minutes, 20 g. of hydrazine was added dropwise over a 15 minute period. Heat was applied to maintain reflux for 2 hours. The catalyst was removed by filtering the hot solution through Celite. After evaporating the solution to approximately 75 cc., the white precipitate was collected and dried to yield 20 g. of p,p'-diaminobenzanilide, melting at 206°–208° C. The elemental analysis of the product was as follows:

| | | | |
|---|---|---|---|
| Calculated: | C — 68.70 | H — 5.76 | N — 18.49 |
| Found: | C — 68.67 | H — 5.80 | N — 18.44 |

EXAMPLE II

To a solution of 36 g. of p-nitrobenzoyl chloride in 100 cc. of tetrahydrofuran was added a solution of 27.7 g. of m-nitroaniline in 100 cc. of tetrahydrofuran. After stirring for one hour at room temperature, the solution was filtered, the precipitate washed with water and dried in a vacuum to provide a tan solid, 4,3'-dinitrobenzanilide melting at 227°–230° C. Reduction was carried out according to the procedure of Example I to provide 4,3'-diaminobenzanilide with a melting point of 170°–172° C.

EXAMPLE III 37 g. of p-nitrobenzoyl chloride in 100 cc. of tetrahydrofuran was added to 30 g. of N-methyl-p-nitroaniline in 300 cc. of tetrahydrofuran. After stirring for 2 hours at room temperature, the solution was filtered and 28 g. of N-(4'-nitrophenyl), N-methyl, 4-nitrobenzamide melting at 148°–151° C. was obtained. Reduction was carried out according to the procedure of Example I to provide 12 g. of N-(4'-aminophenyl), N-methyl, 4-aminobenzamide, melting at 162°–164° C. and having the following elemental analysis:

| | | | |
|---|---|---|---|
| Calculated: | C — 69.9 | H — 6.27 | N — 17.42 |
| Found: | C — 69.6 | H — 6.92 | N — 16.80 |

EXAMPLE IV 37 g. of m-nitrobenzoyl chloride in 100 cc. of tetrahydrofuran was added to 28 g. of p-nitroaniline in 100 cc. of tetrahydrofuran. The thus-formed solution was further diluted with an additional 200 cc. of tetrahydrofuran. After stirring for 1 hour the solution was filtered and 47 g. of 3,4'-dinitrobenzanilide melting at 160°–161° C. was obtained. Reduction was carried out according to the procedure of Example I to provide 3,4'-diaminobenzanilide melting at 153°–156° C.

EXAMPLE V 23.1 g. of 3,5-dinitrobenzoyl chloride in 100 cc. of tetrahydrofuran and 18.3 g. of 3,5-dinitroaniline in 100 cc. of tetrahydrofuran were mixed and refluxed overnight. The solution was cooled, filtered and evaporated to provide 15 g. of 3,3',5,5'-tetranitrobenzanilide melting at 252°–256° C. Reduction was carried out according to the procedure of Example I to provide a brown solid, 3,3',5,5'-tetraaminobenzanilide, melting at 237°–240° C. and having the following elemental analysis:

| | | | |
|---|---|---|---|
| Calculated: | C — 60.7 | H — 5.92 | N — 27.3 |
| Found: | C — 60.49 | H — 5.76 | N — 27.04 |

EXAMPLE VI 18 g. of p-nitrobenzoyl chloride in 100 cc. of tetrahydrofuran was added to 17 g. of 3-nitro-4-chloroaniline in 100 cc. of tetrahydrofuran. The solution was stirred for 5 hours at room temperature, then filtered and the precipitate dried. 18 g. of 4,3'-dinitro, 4'-chlorobenzanilide melting at 225°–229° C. were obtained. Reduction was carried out according to the procedure of Example I to provide 7 g. of 4,3'-diamino, 4'-chlorobenzanilide melting at 205°–209° C. having the following elemental analysis:

| | | | |
|---|---|---|---|
| Calculated: | C — 59.8 | H — 4.58 | N — 16.1 |
| Found: | C — 59.94 | H — 4.72 | N — 16.60 |

EXAMPLE VII 14 g. of p-nitrobenzoyl chloride in 100 cc. of tetrahydrofuran was added to 18.5 g. of o-nitroaniline in 100 cc. of tetrahydrofuran. The solution was stirred at room temperature for 1 hour and then filtered and dried to provide 22 g. of 4,2'-dinitrobenzanilide melting at 195°–205° C. Reduction was carried out according to the procedure of Example I to provide 8 g. of 4,2'-diaminobenzanilide melting at 175°–177° C. and having the following elemental analysis:

| | | | |
|---|---|---|---|
| Calculated: | C — 68.70 | H — 5.76 | N — 18.49 |
| Found: | C — 68.83 | H — 5.73 | N — 18.62 |

The novel polyurethane products of the present invention may be prepared employing a variety of isocyanate terminated prepolymers known to the art, for example, those disclosed in "Advances in Urethane Science and Technology", Vol. 1, K. C. Frisch and S. L. Regan, Technomic Publishing Company, Stanford, Connecticut, 1971 and "Polyurethane Coatings", Keith Johnson, Noyes Data Corporation, New Jersey, 1972. A preferred class of isocyanate terminated urethane prepolymers are disclosed in U.S. Pat. No. 3,188,302 which is incorporated herein by reference.

The following nonlimiting example illustrates the curing of an isocyanate terminated urethane prepolymer within the scope of the present invention.

EXAMPLE VIII 1.15 g. of p,p'-diaminobenzanilide was dissolved in 10 g. of dimethylformamide and the resulting solution was added to 10 g. of an isocyanate terminated prepolymer containing about 4% by weight of available isocyanate groups and prepared from polytetramethylene ether glycol and 2,4-toluene diisocyanate (sold under the trade name ADIPRENE L-100 by E. I. du Pont de Nemours & Company, Wilmington, Delaware). The resulting mixture was then applied to glass surfaces and cured at 110° C. for 3 hours. Tough elastomeric films of cured polymers were obtained. If desired conventional post curing techniques may be employed. The mixture of curing agent and prepolymer, prior to coating, exhibited the following viscosity characteristics as measured by a Brookfield Viscometer, Model LVT, spindle No. 3, at 60 r.p.m.

| Time (seconds) | Viscosity (cps) |
|---|---|
| 200 | 146 |
| 300 | 150 |
| 500 | 160 |

It should be understood that the prepolymer alone in dimethylformamide shown increasing viscosity with time and that the above data represents only pot life and not reaction kinetics.

As stated above, combinations of curing agents of the present invention may be employed satisfactorily. For example, if, for a hot melt application, a curing agent melting point of 138° C. was desired, appropriate amounts of p,p'-diaminobenzanilide (m.p. 206°–208° C.) and 4,3'-diaminobenzanilide (m.p. 170°–172° C.) could be mixed to provide the aforementioned melting point. Thus, hot melt techniques utilizing curing agents of the present invention can be employed over a wide range of temperatures and conditions. A wide range of useful pot lifes and curing times are available with the curing agents of the present invention.

The cured polyurethane products prepared by the present invention may be employed wherever conventional polyurethanes are employed. For example, they are particularly useful for machine parts, potting and encapsulation of electronic equipment, and as a metal replacement. The cured polyurethane products of the present invention are particularly suitable for use in coating the fluid spreading apparatus in cameras of the self-developing type as disclosed in U.S. Pat. No. 3,779,144 issued Dec. 18, 1973.

The specific properties of the polymers formed by the method of the present invention will depend upon the specific isocyanate terminated prepolymer, the specific diamine curing agent, the ratio of isocyanate to amine and the curing cycle employed.

The curing agents of the present invention are satisfactorily employed in curing isocyanate terminated polyurethane compositions when used at a level of about 0.5:1 to 2:1 based on moles of amine to moles of isocyanate, more preferably, the ratio is 0.8:1 to 1.2:1.

What is claimed is:

1. A polyurethane product prepared by reacting an isocyanate terminated urethane prepolymer and a curing agent of the formula:

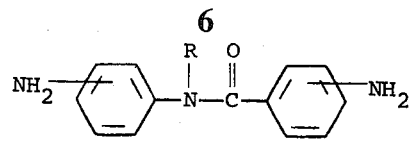

wherein R is hydrogen or alkyl.

2. The product as defined in claim 1 wherein the amine groups are para to the amide groups.
3. The product as defined in claim 1 wherein the amine groups are meta to the amide groups.
4. The product of claim 1 wherein the ratio of said curing agent to said urethane prepolymer is 0.5:1 to 2:1 based on moles of amine to moles of isocyanate.
5. The product of claim 4 wherein the ratio of said curing agent to said urethane prepolymer is 0.8:1 to 1.2:1 based on moles of amine to moles of isocyanate.
6. The product of claim 5 wherein the ratio of said curing agent to said urethane prepolymer is 0.9:1 based on moles of amine to moles of isocyanate.
7. The product of claim 6 wherein said urethane prepolymer has an isocyanate content of about 2–10% by weight.
8. The product of claim 7 wherein said urethane prepolymer has an isocyanate content of about 4% by weight.
9. The product of claim 1 wherein said reaction is carried out as a hot melt.
10. The product of claim 1 wherein said reaction is carried out in a solvent for said urethane prepolymer and said curing agent.
11. The product of claim 1 wherein said curing agent is p,p'-diaminobenzanilide.
12. The product of claim 1 wherein said curing agent is 4,3'-diaminobenzanilide.
13. The product of claim 1 wherein said curing agent is 3,3',5,5'-tetraaminobenzanilide.
14. The method of preparing a cured polyurethane composition which comprises reacting an isocyanate terminated urethane prepolymer and a curing agent of the formula:

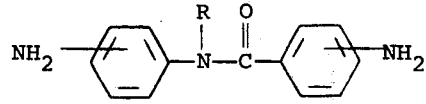

wherein R is hydrogen or alkyl.

15. The method of claim 14 wherein said reaction is carried out in a hot melt.
16. The method of claim 14 wherein said reaction is carried out in a solution.
17. The method of claim 14 wherein the ratio of said curing agent to said urethane prepolymer is 0.5:1 to 2:1 based on moles of amine to moles of isocyanate.
18. The method of claim 14 wherein said urethane prepolymer has an isocyanate content of about 4% by weight.
19. The method of claim 14 wherein said curing agent is p,p'-diaminobenzanilide.
20. The method of claim 14 which includes the step of applying the mixture of said urethane prepolymer and said curing agent to a surface.

* * * * *